United States Patent
Granby et al.

(10) Patent No.: US 10,097,708 B1
(45) Date of Patent: Oct. 9, 2018

(54) SCANNER DEVICE MENU CONTAINING CUSTOM SIZE OPTIONS FOR ITEMS TO BE SCANNED

(71) Applicant: Xerox Corporation, Norwalk, CT (US)

(72) Inventors: Peter Granby, Stevenage (GB); Rajana Mukesh Panchani, London (GB)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/467,350

(22) Filed: Mar. 23, 2017

(51) Int. Cl.
*H04N 1/00* (2006.01)

(52) U.S. Cl.
CPC ..... *H04N 1/00517* (2013.01); *H04N 1/00437* (2013.01); *H04N 1/00482* (2013.01); *H04N 1/00708* (2013.01); *H04N 1/00758* (2013.01); *H04N 1/00779* (2013.01)

(58) Field of Classification Search
USPC .......................................................... 358/1.2
See application file for complete search history.

(56) References Cited

U.S. PATENT DOCUMENTS

| | | |
|---|---|---|
| 5,091,654 A | 2/1992 | Coy et al. |
| 6,516,178 B2 | 2/2003 | Fukushima |
| 6,859,287 B1 | 2/2005 | Frederiksen et al. |
| 7,002,712 B2 | 2/2006 | Barker et al. |
| 7,577,393 B2 | 8/2009 | Suzuki et al. |
| 7,761,021 B2 | 7/2010 | Takeuchi |
| 8,508,784 B2 | 8/2013 | Miyata |
| 8,677,267 B2 | 3/2014 | Litwiller |
| 9,275,313 B2 | 3/2016 | Kojima |
| 2002/0003981 A1* | 1/2002 | Fukushima .......... G03G 15/607 399/370 |
| 2005/0179914 A1 | 8/2005 | Fuse |
| 2006/0239731 A1* | 10/2006 | Suzuki ............... G03G 15/6508 399/389 |
| 2006/0268328 A1 | 11/2006 | Park et al. |
| 2008/0240751 A1* | 10/2008 | Miyata ............... G03G 15/5095 399/45 |
| 2015/0029539 A1* | 1/2015 | Kim ..................... G06K 15/005 358/1.15 |

* cited by examiner

*Primary Examiner* — Ngon Nguyen
(74) *Attorney, Agent, or Firm* — Gibb & Riley, LLC (57) ABSTRACT

A processor is electrically connected to a scanner, an electronic memory electrically, and a user interface (having a display screen). The display screen displays dimension input fields that identify dimensions of an item to be scanned using the scanner. The display screen also displays an option to reuse the most recently used input dimensions for the item to be scanned, and an option to select from a list of recently used input dimensions for the item to be scanned. The processor saves values of the dimension input fields in the electronic memory, upon the dimensions of an item to be scanned being identified by the user through the dimension input fields.

20 Claims, 10 Drawing Sheets

SCANNER DEVICE MENU CONTAINING CUSTOM SIZE OPTIONS FOR ITEMS TO BE SCANNED

BACKGROUND

Items herein generally relate to scanner equipment and methods, and more particularly to such methods that display a scanner device menu containing custom size options for items to be scanned.

One useful data item when performing scanning is the size of the item being scanned. This allows data to be taken from a limited area of the overall platen (potentially reducing file size to improve storage efficiency), allows processing resources to be focused on a smaller number of pixels from the optical sensor, eliminates problems with scanning undesirable elements (e.g., scanning portions of the platen cover, border edges of the item being scanned, shadow areas, etc.), etc. If a standard size item is being scanned, the dimensions can be known with certainty; however, if a non-standard size item is being scanned, many times the user is required to manually enter the size of the item.

Scanning equipment can perform a relatively lower resolution ("quick") scan to identify characteristics of an item that is to be scanned. Such a quick scan allows the scanner to automatically set parameters, such as color/monochrome choice, scan area identification, resolution, orientation, etc. During this quick scan, the scanner can detect a size issue, primarily as to whether the item to be scanned has an industry standard size or not. If a size issue is detected, such scanners can present an exception window to the user to allow the user to manually enter the dimensions of the item to be scanned.

However, if a user regularly scans documents that are not standard sizes on the platen, conventional scanners require users to always enter the size of the item to be scanned manually, and this can be time consuming, especially if there are multiple pages of the same custom size that are to be scanned.

SUMMARY

An exemplary apparatus herein comprises (among other components) a processor electrically connected to a scanner, an electronic memory, and a user interface (having a display screen). The processor includes a set of instructions (that can be software or hardware based) that allow the processor to determine whether and how to display a scan size menu screen, based on whether the scanner detects an attempt to scan an industry standard size item or a custom size item (that does not match an industry standard size).

More specifically, the scan size menu screen includes dimension input fields for the item to be scanned. The scanner can perform a pre-scan operation of the item to be scanned (e.g., low resolution, quick scan) that produces a pre-scan image, and the processor automatically makes an estimate of the dimensions of the item to be scanned based on the pre-scan image. Then, the processor can automatically supply these estimated dimensions to the dimension input fields, which can simply be accepted by the user, or altered by the user. In one example, the display screen can be a touch screen, and the dimension input fields can be for length and width measures that are manually adjusted by the user, using adjustment buttons on the touch screen.

As an alternative to such manual adjustments, in order to simplify and shorten the process of identifying the dimensions of the item to be scanned, the scan size menu screen also displays an option to simply reuse the most recently used input dimensions for the item to be scanned, and another option to simply select from a list of recently used input dimensions for the item to be scanned. The most recently used input dimensions are dimensions of the very last item scanned (e.g., the item that was last used when scanning with the scanner).

The scan size menu screen can optionally display an additional menu choice of whether to save the dimensions of the dimension input fields. The processor saves the values set in the dimension input fields as a list of recently used input dimensions in the electronic memory, (upon the dimensions being indicated as being saved by the user, or automatically); but only saves such if the values of the dimension input fields are not previously saved in the electronic memory.

The display screen can also display a user identification input field. Then, in response to a user identifier being supplied to the user identification input field, the processor can automatically supply user-preferred dimensions (e.g., a favorite set of dimensions) to the dimension input fields (without requiring the user to enter any dimensions). In order to establish such user-preferred dimensions, the display screen can display a user-specific menu option that allows the user to manually define their user-preferred dimensions, or the processor can automatically learn the user-preferred dimensions (potentially over time) based on previous scanning operations performed when the user's user identifier is logged in.

Presented in method form, with various methods herein a scanner can perform a pre-scan operation of an item to be scanned (e.g., low resolution, quick scan) that produces a pre-scan image, and the processor can automatically make an estimate of the dimensions of the item to be scanned based on the pre-scan image. These methods thus determine whether to display the scan size menu screen (containing the dimension input fields) on the display screen, based on whether the pre-scan image indicates an attempt to scan an industry standard size item or a custom size item that does not have an industry standard size.

As noted previously, instead of selecting or setting a custom size for the item to be scanned, the scan size menu screen can also display an option to just use the closest industry standard dimension set for the item to be scanned. Selection of such an option closes the scan size menu screen and performs the scan using the selected dimension set.

If the analysis of the pre-scan image indicates that a custom, non-standard size item is to be scanned, these methods display (on the scan size menu screen that is on the display screen) various items, including the dimension input fields that identify dimensions of the item to be scanned using the scanner. With these methods, the processor can automatically supply dimensions estimated from the pre-scan image to the dimension input fields. These estimated dimensions can simply be accepted by the user, or altered by the user. In one example, the display screen can be a touch screen, and the dimension input fields can be length and width measures that are manually adjusted by the user using adjustment buttons on the touch screen.

Another item these methods display (on the scan size menu screen that is on the display screen) is an option to reuse the most recently used input dimensions of the previous item that was scanned. Again, the most recently used input dimensions are the dimensions of the item that was last scanned with the scanner. Another option that is displayed by such methods (on the scan size menu screen that is on the display screen) is an option to select from a list of recently used input dimensions for the item to be scanned.

In such methods, the display screen can also display a user identification input field. Then, in response to a user identifier being supplied to the user identification input field, the processor can automatically supply user-preferred dimensions to the dimension input fields (without requiring the user to enter any dimensions). In order to establish such user-preferred dimensions, the display screen can display a user-specific menu option that allows the user to manually define their user-preferred dimensions, or the processor can automatically learn the user-preferred dimensions (potentially over time) based on previous scanning operations performed when the user's user identifier is logged in.

Further, these methods can also display (on the scan size menu screen that is on the display screen) an option of whether to save the dimensions of the dimension input fields as an addition to the recently used input dimensions stored in the electronic memory. If this option is selected (or this can occur automatically) such methods save the values of the dimension input fields as another recently used input set of dimensions in the electronic memory (e.g., automatically, upon the dimensions of the item to be scanned being identified through the dimension input fields, and the scan being performed). The process of saving the values of the dimension input fields as one of the recently used input dimensions in the electronic memory may be performed only if the values of the dimension input fields are not previously saved in the electronic memory.

These and other features are described in, or are apparent from, the following detailed description.

BRIEF DESCRIPTION OF THE DRAWINGS

Various exemplary methods and systems are described in detail below, with reference to the attached drawing figures, in which.

DETAILED DESCRIPTION

As mentioned above, if a user has to regularly scan documents that are not standard sizes, they enter the size manually, which can be time consuming, especially if there are multiple pages of the same size that have to be scanned. In view of this, with the methods and devices herein, the user is offered the option to use shortcut buttons to speed up the process. Therefore, when these methods and devices detect a platen size issue, and the exception window is raised, the user can either select the last size used (straight away by simply pressing a button) or select from a list of custom scan sizes that have been previously used and saved.

Some of the buttons include a menu option to use the last custom size entered, a menu option to use custom size presets, etc. User selection of the "last custom size" button instructs the scanner to use the last custom size settings. This option is available after at least one custom size scan has been performed, and otherwise this option is grayed out.

In case of user selection of the "use custom size presets" button, the methods and scanners herein track the different custom sizes that have been previously used during previous scans. This tracking can be carried out automatically by the controller, so every time the "custom size" option is used, the user interface informs the controller that a custom size item is being scanned, and what size has been selected by the user. In response, the controller automatically stores this custom size in the list of custom size presets (if it has not already been stored in the list of custom size presets). When the user selects the "use custom size presets" button, then the user interface sends a request to the controller to send the stored list of custom scan sizes, back to the user interface.

When the user interface receives the list of custom size presets, it first checks the list to see if it is empty. If list of custom size presets is empty, then the user interface will display a message informing the user that they have to enter a custom size manually. If the list of custom size presets is full, then the user interface will display a screen that includes all of the custom scan sizes. This allows the user to scroll through the list and select whatever custom size they want. Once the custom size has been confirmed, then that size will be used as scan size by the scanner.

Also, when one of the custom sizes in the list of previously saved custom sizes is highlighted, selection of a "favorite custom size" button identifies that size as the user's favorite custom size. The display screen can also display a user identification input field. In response to a user identifier being supplied to the user identification input field, the processor can automatically supply the user-preferred dimensions (e.g., favorite) to the dimension input fields, (without requiring the user to enter any dimensions, or make any other selections). While the display screen can display a user-specific menu option that allows the user to manually define their favorite dimensions; the processor can alternatively automatically learn the user-preferred dimensions (potentially over time) based on previous scanning operations performed when the user is logged in (using the user identification input field). More specifically, in addition to (or as an alternative to) the user manually selecting the "favorite custom size" button, the processor can statistically keep track of which custom size in the saved dimension list is most frequently used by that user. Then, when that user places their identification information in the identification input field, that user's favorite custom size can be automatically populated to the dimension input fields.

Thus, as the user's scanning activities change over time, the user's favorite custom size will similarly change over time, because the processor statistically tracks the user's scanning activities. Therefore, these options further simplify the user's interaction with the user interface when performing custom-sized scans, because the user can potentially just enter their identification information and (so long as the item they are scanning is the same size as the items they most commonly scan) simply press the scan button to begin the custom-size scanning process. This improves the operating efficiency of the scanning device, and this also makes the user experience easier and more enjoyable, especially when performing custom-size scans.

The methods and devices herein speed up the process of scanning custom sized originals by allowing users to select either the last custom scan size, or select from the list of previously used custom scan sizes. In one example (an expense claims department that has multiple receipts to scan) the methods and devices herein allow the users to simply press a single button to scan in custom size originals, and this improves productivity.

Figure 10:
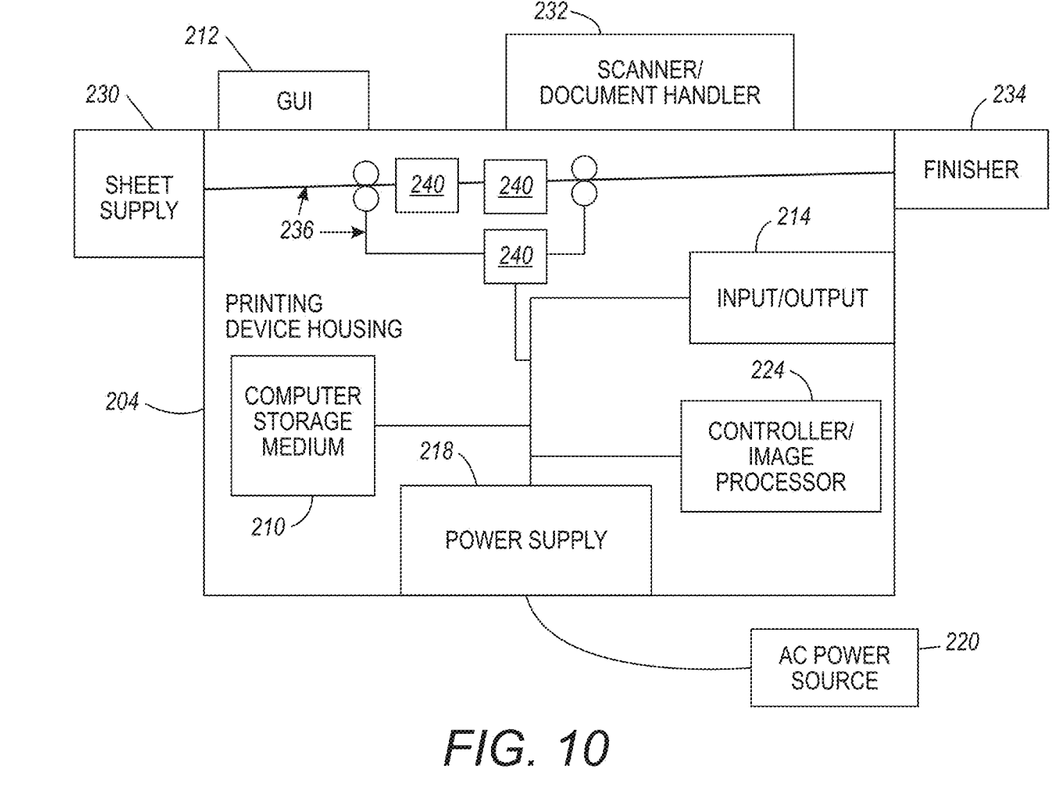
FIG. 10 is a schematic diagram illustrating systems herein.

As shown in FIG. 10 (discussed in detail below) an exemplary apparatus herein comprises (among other components) a processor 224 electrically connected to a scanner 232, an electronic memory 210, a user interface 212 (having a display screen), etc. The processor 224 and/or memory 210 includes a set of instructions (that can be software or hardware based) that allow the processor 224 to determine whether and how to display a scan size menu screen 100 (FIG. 1), based on whether the scanner 232 detects an attempt to scan an industry standard size item or a custom size item (that does not match an industry standard size). Various other menus can be presented on the user interface 212 proceeding and following the scan size menu screen 100; however, such menus are not shown or discussed herein so as to maintain focus on the salient features of the present embodiments. For example, the cancel menu option button 112 returns to a previous menu.

The scanner 232 can perform a pre-scan operation of the item to be scanned (e.g., relatively low resolution, quick scan) that produces a pre-scan image, and the processor 224 can automatically make an estimate of the dimensions of the item to be scanned based on the pre-scan image. The scanner 232 can perform the pre-scan operation either automatically (e.g., always) or only when the user selects the auto detect option menu button 102.

Figure 1:
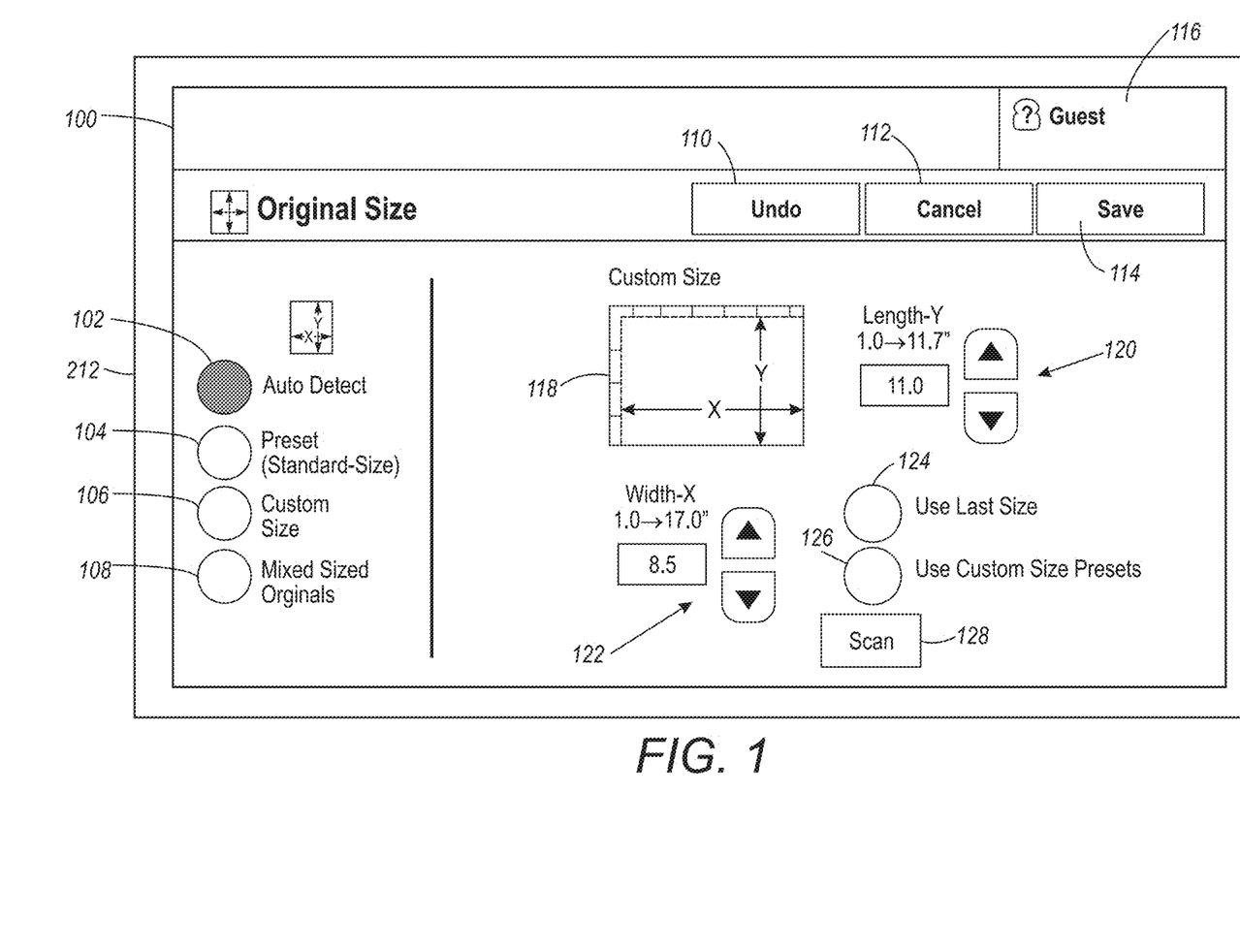
FIGS. 1-8 are schematic diagrams illustrating various menu provided by devices herein herein.

As shown in FIG. 1, the scan size menu screen 100 includes dimension input fields 120, 122 for the item to be scanned. FIG. 1 also includes a graphic illustration 118 of an item being scanned (potentially with graduations along the border) that helps the user understand the meaning and orientation of the X and Y dimension input fields 120, 122. In one example, the display screen 100 can be a touch screen, and the dimension input fields 120, 122 can be for length and width measures that can be manually adjusted by the user, using adjustment buttons on the touch screen 100. Execution of the "undo" button 110 clears any fields that have data therein (or the undo button 110 can be repeatedly selected to progressively go back through various data entries in the order in which they were provided).

Figure 2:
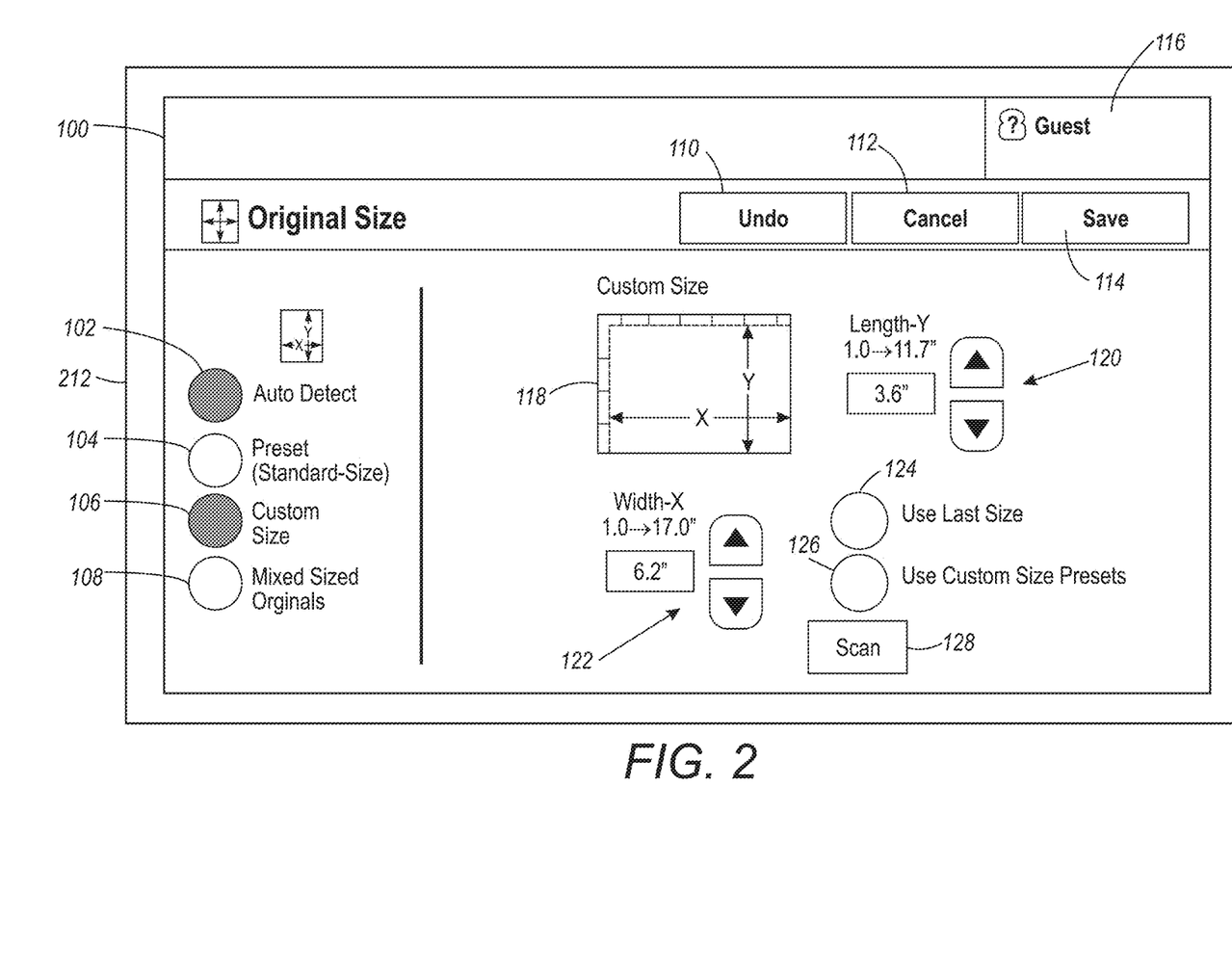

The processor 224 can automatically supply the estimated dimensions from the pre-scanned image to the dimension input fields 120, 122, which can simply be accepted by the user, or manually altered by the user. In the example shown in FIG. 1, the estimated dimensions generated from the pre-scan image are a standard measure (e.g., 8.5"×11"); however, the estimated dimensions can be custom sizes (e.g. other than standard-sized papers: letter 8.5"×11"; legal 8.5"× 14"; A3; A3 long; A4; A5; A6; B3; B4 B5; postcard; business card; etc.); as shown in FIG. 2. Note that in FIG. 2, the custom size button 106 is automatically highlighted when the pre-scanned image is determined to not be an industry-standard size (e.g., 6.2"×3.6" custom size in FIG. 2).

FIG. 1 shows that the scan size menu screen 100 includes a scan menu option button 128, which allows the user to accept the dimensions currently in the dimension input field 120, 122 (which can be the estimated dimensions, automatically or manually entered dimensions, or the such dimensions adjusted manually). Selection of the scan button 128 may cause an additional menu to be presented, but eventually causes the menu screen 100 to close and the scanner 232 to perform a higher resolution scan (that takes more time and consumes more processing resources) relative to the low resolution, quick scan used in the pre-scanning operation.

Figure 3:
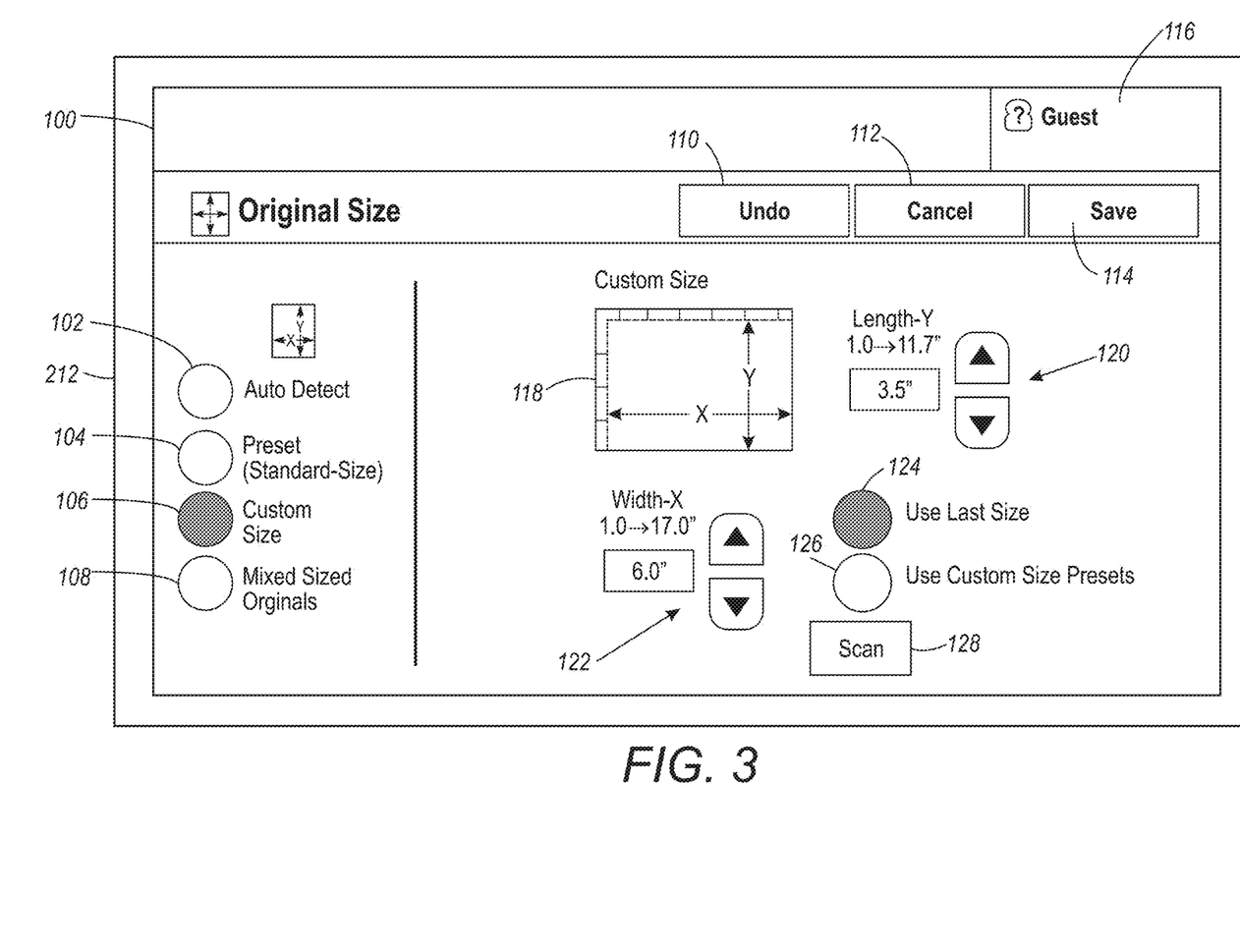

As an alternative to the hardware device utilization intensive pre-scanning operation, and/or user time intensive manual input and adjustments shown in FIGS. 1 and 2, in order to simplify and shorten the process of identifying the dimensions of the item to be scanned, the scan size menu screen 100 also displays an option 124 to simply reuse the most recently used input dimensions for the item to be scanned, as shown in FIG. 3. Selection of the "use last size" button 124 causes the dimension input fields 120, 122 to be automatically populated with the most recently used scan size (custom or standard) that were used in the very last (immediately previous) scanning operation.

Therefore, to perform a scan of items that have the same size as the most recently scanned items, the user only needs to select the "use last size" menu option button 124 and the scan button 128 (pressing each just a single time); which avoids the pre-scan operation, and avoids any adjustments or manual entry into the dimension input fields 120, 122. This greatly simplifies the operation from the user's viewpoint by reducing the number of interactions with the user interface 212, decreases the amount of time needed to begin the scanning operation, etc. This, in turn, reduces the amount of time that the user interface 212 is on (thereby saving power) and also reduces the load on all processing components (e.g., reduces load on the scanner 232, by potentially avoiding pre-scan operations; reduces load on the processor 224, by avoiding calculating estimated dimensions; etc.). Note, that some scanning operations always perform a pre-scan in order to automatically establish other scanner settings and parameters (e.g., monochrome vs. color scan item, text vs. image scan item, etc); however, the "use last size" menu option button 124 can still save pre-scan operations from being performed for those scanning operations that would not otherwise utilize a pre-scan operation.

Thus, the "use last size" button 124 reduces power consumption by reducing the amount of power consumed by the user interface 212, the scanner 232, the memory 210, the processor 224, etc. This also potentially allows less expensive, lighter, smaller scanners 232, memories 210, processors 224, etc., to be utilized (thereby reducing the cost, weight, material usage, etc., of the scanning device) because such scanner hardware will be utilized less (and can be less robust) when the pre-scan operation and the process of determining the estimated dimensions as avoided. In other words, these options improve the operating efficiency of the scanning device, and potentially allow the scanning device to be made differently so that it is less expensive, lighter, uses less materials, etc., because it does not need to be as robust; and this also makes the user experience easier and more pleasurable, especially when performing custom-size scans.

Figure 4:
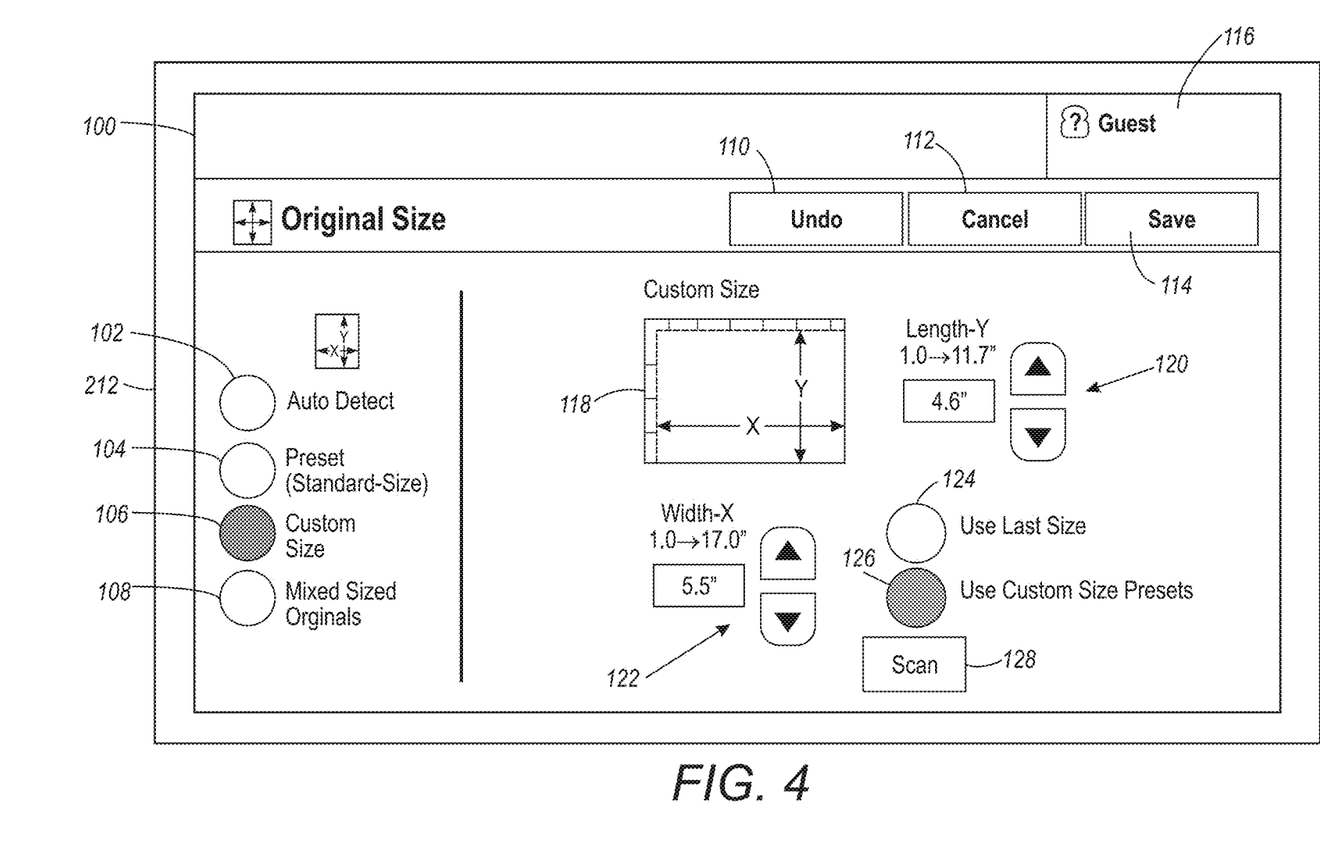

FIG. 4 also illustrates another option 126 to simply select from a list of recently used custom dimensions for the item to be scanned. Note that the "use custom size presets" button 126 is in addition to the standard-size preset button 104, which causes an additional menu containing a list of industry-standard paper sizes (that cannot be edited by the user) to be displayed when selected by the user.

Figure 5:
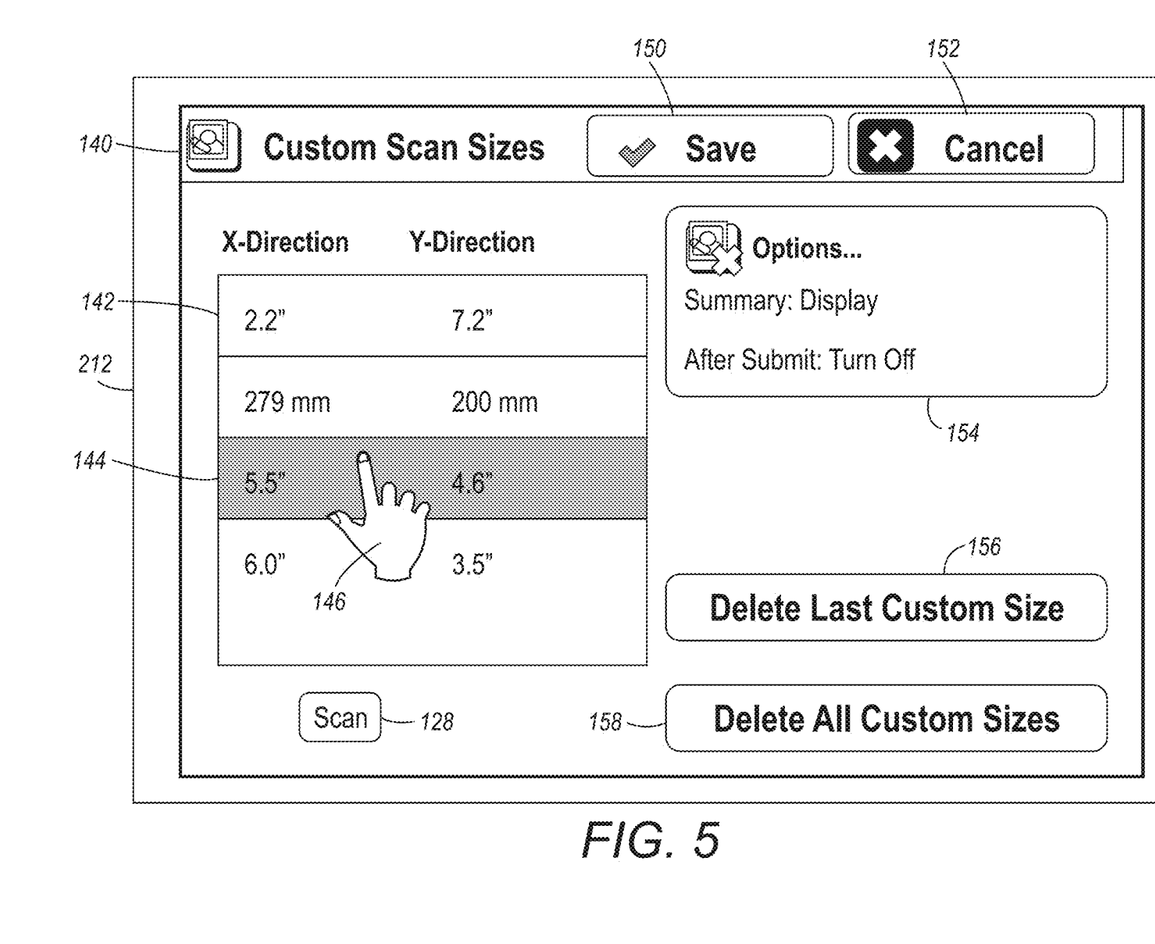

More specifically, upon selection of the "use custom size presets" button 126, the menu of previously stored custom sizes 140 shown in FIG. 5 is displayed on the user interface 212. As shown in FIG. 5, the menu of previously stored custom sizes 140 includes a cancel button 152 that returns to the menu shown in FIG. 4. Additionally, this menu 140 includes a list 142 of previously saved custom sizes. FIG. 5 illustrates that the user is selecting the third custom size 144 in the list 142, as indicated by the user interaction icon 146. Note that FIG. 4 illustrates this custom size 144 (e.g., 5.5"×4.6") automatically populated in the dimension input fields 120, 122 after the user has selected the third custom size 144 from the list 142 of previously saved custom sizes in FIG. 5.

FIG. 5 additionally illustrates various options that can be set (item 154) including whether to display a summary, whether to turn the menu off after submission, etc. Further, menu 140 includes an option button to delete the last custom size that was used 156, and an option button to delete all custom sizes from the list 158. After any change is made to the list 142, user selection of the save button 150 saves the revised list 142 in the electronic memory 210. Also, FIG. 5 includes the previously mentioned scan button 128 to allow the scanning operation to be started directly from the custom scanned size menu 140, avoiding the need to progress through any other menus to begin the high resolution scanning process.

Figure 6:
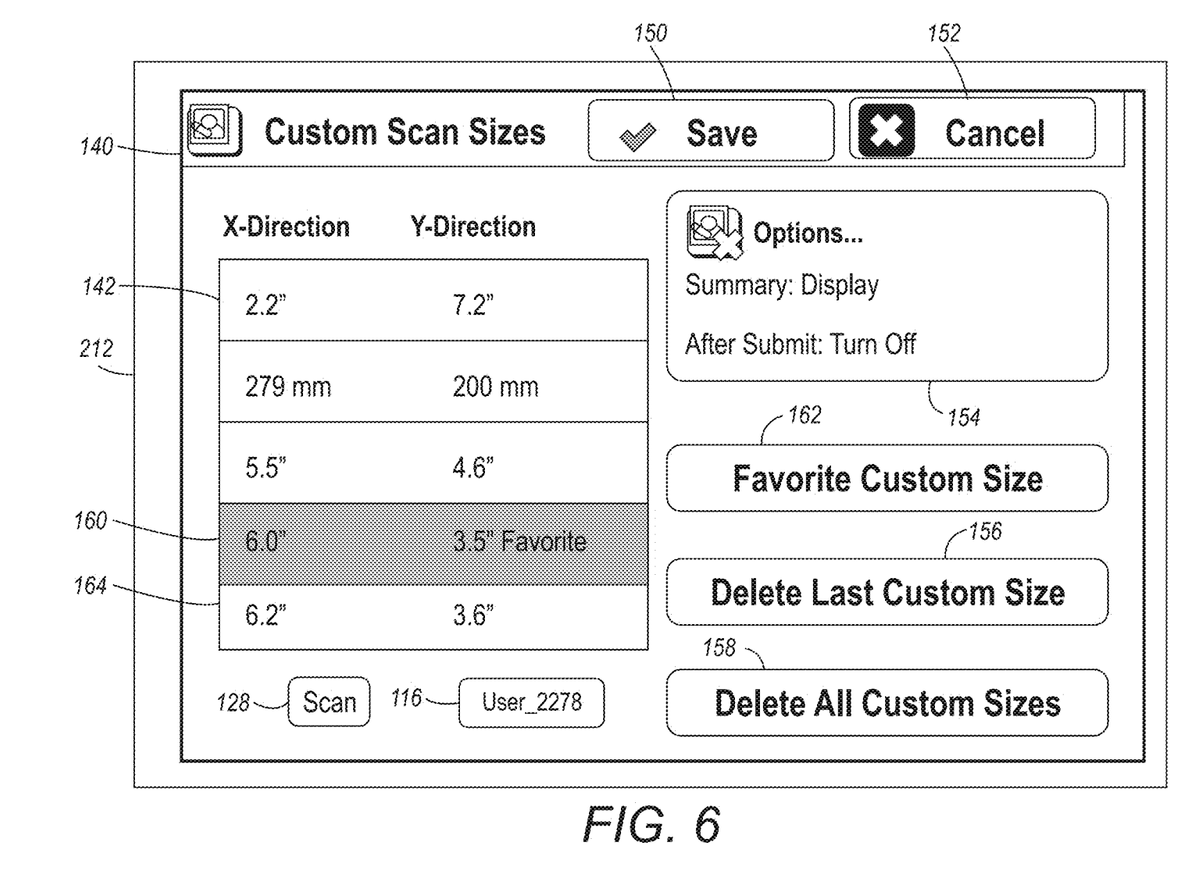

FIG. 6 is similar to FIG. 5; however FIG. 6 includes a new entry 164 in the list 142 of previously saved custom sizes compared to FIG. 5. More specifically, the entry 164 (e.g., 6.2"×3.6") is the estimated dimensions produced by the pre-scan operation shown in FIG. 2, discussed above. By executing the save menu option button 114 (shown in FIG. 2), the currently entered values of the dimension input fields 120, 122 (e.g., 6.2"×3.6") are automatically added to the list 142 of previously saved custom sizes (as shown in item 164 in FIG. 6). Thus, the scan size menu screen can optionally display an additional menu choice 114 of whether to save the dimensions of the dimension input fields 120, 122. The processor 224 saves the values set in the dimension input fields 120, 122 as another recently used input dimensions set in the electronic memory, (upon the dimensions being indicated as being saved by the user, or automatically); but only saves such if the values of the dimension input fields 120, 122 are not previously saved in the electronic memory, to avoid redundant entries.

Therefore, through selection of the save button 114, and the delete buttons 156, 158, the user can easily edit the list 142 of previously saved custom sizes. Once the list 142 contains the custom sizes that the user finds useful, the save button 150 can be selected, which saves the list 142 in memory 210, and returns the user interface 212 to the menu shown in FIG. 4.

Figure 7:
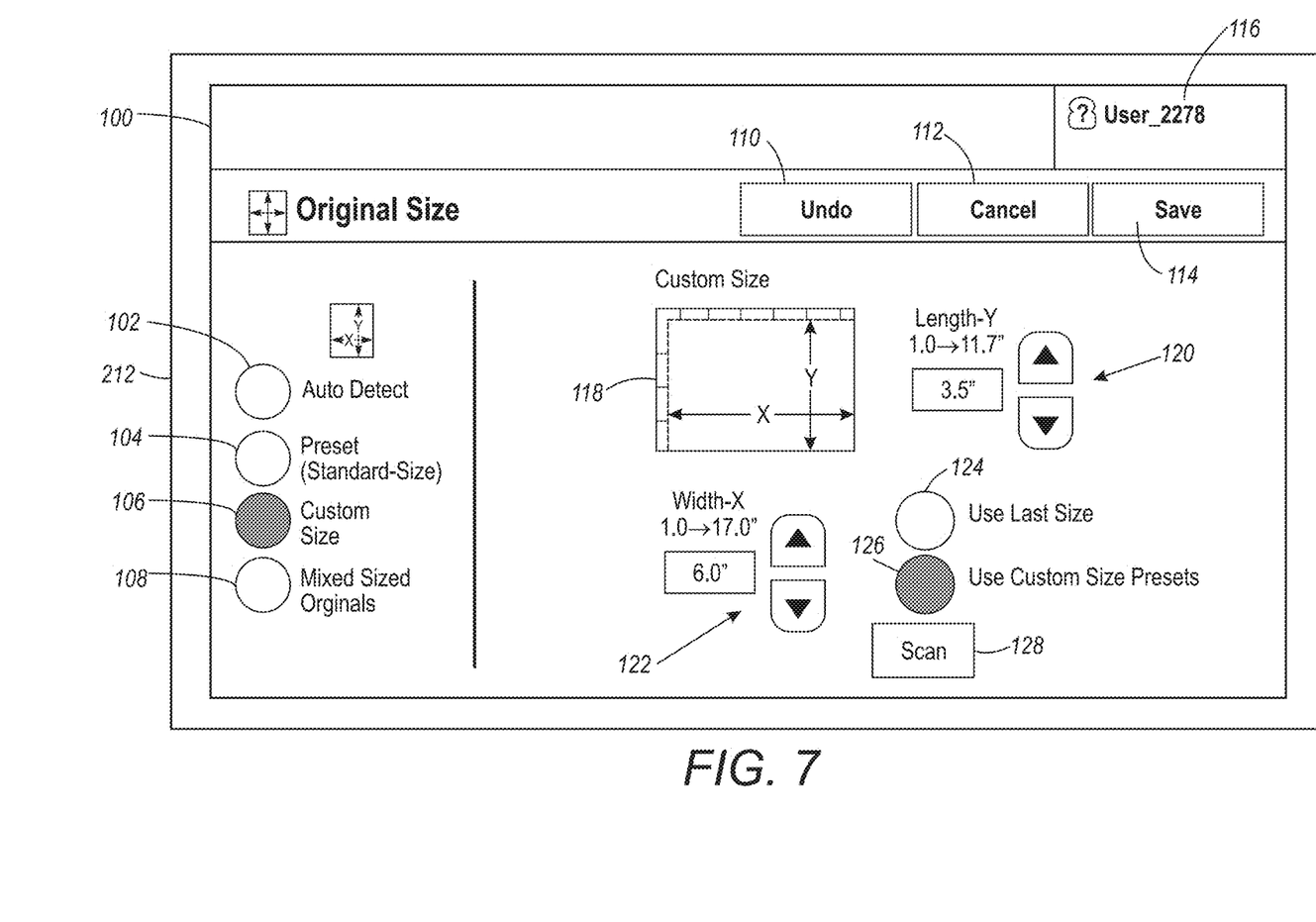

FIG. 6 also illustrates a "favorite custom size" menu option button 162. When one of the custom sizes in the list 142 is highlighted (e.g., item 160), selection of the "favorite custom size" button 162 identifies that size 160 as the favorite custom size. As shown in FIG. 7, the display screen can also display a user identification input field 116. In response to a user identifier being supplied to the user identification input field 116, the processor 224 can automatically supply the user-preferred dimensions (e.g., the favorite 160, shown in FIG. 6) to the dimension input fields 120, 122 (without requiring the user to enter any dimensions, or make any other selections). Note that FIG. 6 also includes the same user identification input field 116 to allow the selected favorite to be associated with a specific user. In addition, users are provided the option to manually type in dimensions into the list 142 of saved dimension sets, to manually add to the list, and manually add a new favorite dimension set.

While FIG. 6 shows that, in order to establish such user-preferred favorite dimensions 160, the display screen 140 can display a user-specific menu option 162 that allows the user to manually define their user-preferred dimensions 160; the processor 224 can alternatively automatically learn the user-preferred dimensions (potentially over time) based on previous scanning operations performed when the user is logged in (using the user identification input field 116). More specifically, in addition to (or as an alternative to) the user selecting the "favorite custom size" button 162, the processor can statistically keep track of which custom size in the list 142 is most frequently used by that user. Then, when that user places their identification information in the identification input field 116, that user's favorite custom size (e.g., 160) can be automatically populated to the dimension input fields 120, 122, without the user having to identify a favorite dimension set or enter dimensions into the dimension input fields 120, 122.

Thus, as the user's scanning activities change over time, the user's favorite custom size will similarly change over time, because the processor statistically tracks the user's scanning activities. Therefore, these options further simplify the user's interaction with the user interface 212 when performing custom-sized scans, because the user can potentially just enter their identification information in the identification input field 116 and (so long as the item they are scanning is the same size as the items they most commonly scan) simply press the scan button 128 to begin the custom-size scanning process. As noted above, this improves the operating efficiency of the scanning device, and potentially allows the scanning device to be made differently so that it is less expensive, lighter, uses less materials, etc., because it does not need to be as robust; and this also makes the user experience easier and more pleasurable, especially when performing custom-size scans.

Figure 8:
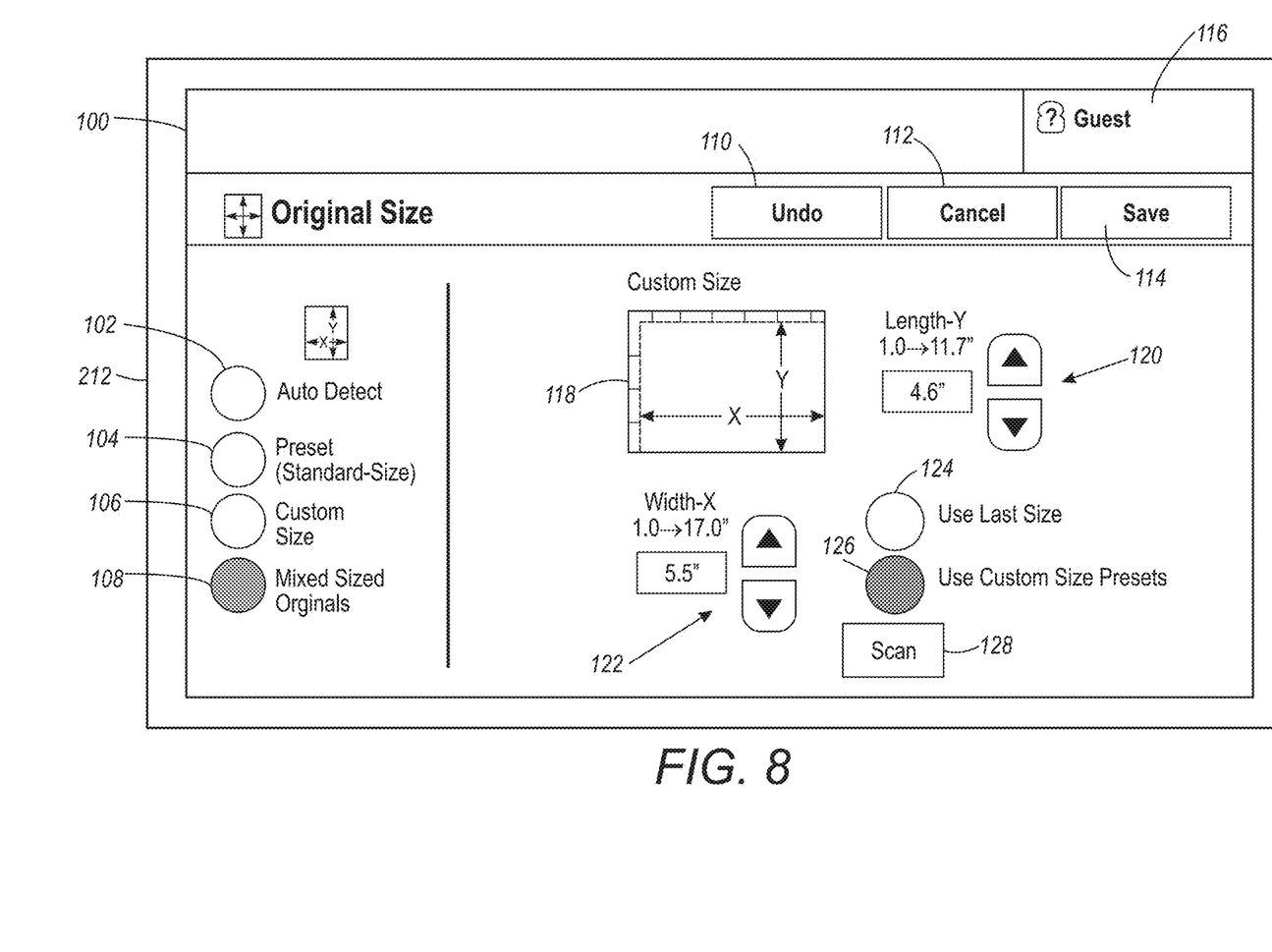

FIG. 8 illustrates that a mixed size originals button 108 and the "use custom size presets" button 126 have been selected by the user. This allows the user to perform scanning by picking different sizes from the list 142 of saved custom sizes sequentially, as different pages are scanned. Therefore, if the mixed size originals menu option 108 is selected, after each sheet is scanned, the custom size menu 140 reappears to allow the user to select the next custom size from the list 142 of saved custom sizes. As noted above, scan button 128 allows the user the option of beginning a scan directly from the custom scanned sizes menu 140, allowing the custom size menu 140 to be the only menu needed to scan many different sized (custom size) items, further increasing user satisfaction and machine efficiency.

Figure 9:
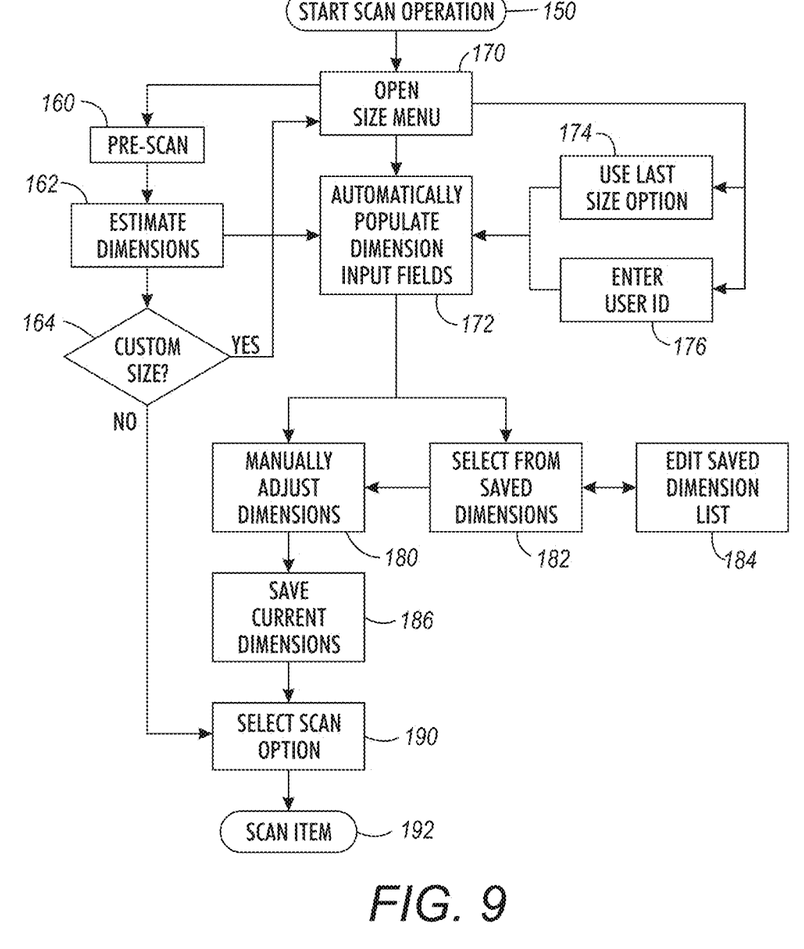
FIG. 9 is a flow diagram of various methods herein.

FIG. 9 is a flowchart illustrating exemplary methods herein, which starts with a scan operation being initiated in item 150 by a user selecting a scan option from a main menu, by a user lifting a platen cover, or by a user placing items into a document handler, etc.

As shown in item 170, the scan size menu can be immediately opened in response to starting the scan in item 150. Further, these methods optionally perform a pre-scan operation of the item in item 160 (e.g., low resolution, quick scan; automatically, or upon selection of button 102) that produces a pre-scan image. In item 162, the processor can automatically make an estimate of the dimensions of the item to be scanned based only on the pixel analysis of the pre-scan image. These methods can thus determine whether to display the scan size menu screen (containing the dimension input fields) on the display screen in item 164, based on whether the pre-scan image indicates an attempt to scan an industry standard size item or a custom size item that does not have an industry standard size. A determination in item 164 that a non-standard size item is being scanned will cause processing to flow back to item 170.

Once opened, the dimension input fields can be automatically populated in item 172 in a number of ways with the methods herein. For example, the dimension estimate calculated from the pre-scanned image in item 162 can be used to populate the dimension input fields and item 172. Alternatively, these methods display (on the scan size menu screen that is on the display screen) option 124 to reuse the most recently used input dimensions for the item to be scanned, and selection of option 124 causes the most recently used dimensions in the previous scan to be populated into the to dimension input fields as shown in item 174.

Again, the most recently used input dimensions are the dimensions of the item that was last scanned with the scanner.

In such methods, the display screen can also display a user identification input field (176). Then, in response to a user identifier being supplied to the user identification input field 116, the processor can automatically supply user-preferred dimensions to the dimension input fields (without requiring the user to enter any dimensions) as show by the arrow from item 174 to item 172. As noted above, in order to establish such user-preferred dimensions, the display screen can display a user-specific menu option that allows the user to manually define their user-preferred dimensions (FIG. 6), or the processor can automatically learn the user-preferred dimensions (potentially over time) based on previous scanning operations performed when the user's user identifier is logged in to the user identification input field 116.

Another option that is displayed by such methods (on the scan size menu screen that is on the display screen) is an option 126 to select from a list of recently used input dimensions for the item to be scanned, in item 182. As shown above, when using option 126, the user also can edit the save dimension list, as shown in item 184.

Therefore, there are many ways that these methods allow the user to establish the values of the dimension input fields, without having to manually input the dimension values (e.g., 162, 172, 174, 176, 182, etc.). These automatically supplied dimensions can simply be accepted by the user, or optionally manually altered by the user, as shown in item 180. In one example, the display screen can be a touch screen, and the dimension input fields can be length and width measures that are manually adjusted by the user in item 180 using adjustment buttons on the touch screen.

Further, in item 186, these methods can also display (on the scan size menu screen that is on the display screen) an option of whether to save the dimensions of the dimension input fields as an addition to the recently used input dimensions stored in the electronic memory. If this option 186 is selected (or this can occur automatically) such methods save the values of the dimension input fields as another one of the recently used input dimensions in the electronic memory that are available for selection in item 182 (e.g., automatically, upon the dimensions of the item to be scanned being identified through the dimension input fields, and the scan being performed). The process of saving the values of the dimension input fields as one of the recently used input dimensions in the electronic memory in item 186 may be performed only if the values of the dimension input fields are not previously saved in the electronic memory.

As items 174, 176, and 182 are alternatives, these methods allow the user to just use the dimension estimate from the pre-scan for the item to be scanned and just proceed directly from item 172 to item 190 by selecting a scan option, instead of selecting or setting a custom size for the item to be scanned. At whatever step in the process the scan option 190 is selected, this closes the scan size menu screen and performs the scan in item 192 using the selected dimensions.

The hardware described herein plays a significant part in permitting the foregoing method to be performed, rather than function solely as a mechanism for permitting a solution to be achieved more quickly, (i.e., through the utilization of a computer for performing calculations). As would be understood by one ordinarily skilled in the art, the processes described herein cannot be performed by a human alone (or one operating with a pen and a pad of paper) and instead such processes can only be performed by a machine (especially when the volume of data being processed when scanning and automatically identifying size through pixel analysis, and the speed at which such data needs to be evaluated is considered). For example, if one were to manually attempt to perform the pre-scan and actual scan (and dimension estimates) performed by the methods and devices discussed above, the manual process would be sufficiently inaccurate and take an excessive amount of time so as to render the manual classification results useless. Specifically, processes such as scanning, processing scanned data pixel-by-pixel, electronically storing previously used dimensions as 1's and 0's, etc., requires the utilization of different specialized machines, and humans performing such processing would not produce useful results because of the time lag, inconsistency, and inaccuracy humans would introduce into the results.

Further, such machine-only processes are not mere "post-solution activity" because the use of a scanner to scan an item, and the use of a display screen to provide menu options to a user are integral with the process performed by the methods herein, and are not mere post-solution activity. In other words, these various machines are integral with the methods herein because the methods cannot be performed without the machines (and cannot be performed by humans alone).

Additionally, the methods herein solve many highly complex technological problems. For example, as mentioned above, the methods and devices herein greatly simplify the operation from the user's viewpoint by reducing the number of interactions with the user interface, which decreases the amount of time needed to begin the scanning operation, etc. This, in turn, reduces the amount of time that the user interface is on (thereby saving power) and also reduces the load on all processing components (e.g., reduces load on the scanner, by potentially avoiding the pre-scan operation; reduces load on the processor, by avoiding calculating the estimated dimensions; etc.). Thus, the methods herein reduce the amount and complexity of hardware and software needed to be purchased, installed, and maintained, thereby solving a substantial technological problem that providers experience today.

More specifically, with respect to such technical problems, the field of print media (unprinted bulk media (e.g., blank unprinted paper, card stock, transparencies, etc.) on to which markings are printed by a printing engine) suffers technical problems associated with non-standard sized print media, and has produced some solutions to their technical problems. However, these technical problems are different from the technical problems associated with systems that address the technical problems of non-standard sized scannable items.

More specifically, because print media is generally mass manufactured, the majority of such product are produced in standard sizes, and non-standard size print media is much less common when compared to users attempt to scan non-standard size items on a platen to obtain an image of the scanned item. Indeed, it is very common for items that will be scanned for the purpose of obtaining images to have a non-standard size because users often physically alter items before scanning (e.g., users cut out or tear out portions of printed sheets, newspapers, etc.); or items that are scanned come from somewhat unusual sources, such as cash register receipts, pages of an expense journal, uniquely cut business cards, uniquely sized photographs, uniquely shaped physical items, etc. Therefore, these two very different technical fields (printing and scanning) suffer from very different technical problems and are therefore not closely related.

Therefore, when dealing with print media, there are likely to be a relatively smaller number of non-standard sizes, which allows the technical solutions to be relatively less efficient and potentially more cumbersome. For example, one technical solution for handling non-standard size print media is to utilize a scanner to scan one of the non-standard size sheets for the sole purpose of determining the non-standard size of such print media (which is very different from the goal of producing a scanned image). However, such a solution requires the user to remove a blank sheet from the paper tray, scan the blank sheet, and then return the blank sheet to the paper tray, all of which is unrelated to the actual printing operation, and represents inefficiencies. Other solutions to the technical issues associated with non-standard size print media use physical sensors in paper trays, or in paper feeding systems, that physically detect the location of the edges of the non-standard size print medium so as to automatically estimate the size of the non-standard print media. However, such solutions require the additional expense associated with such sensors. Of course, such systems also can require the user to physically measure the non-standard print media and manually enter such measurements. All these processes add inefficiencies to the act of printing on the print media.

To the contrary, because it is much more common for users to attempt to scan non-standard size items than it is to print on non-standard size print media, and because the number of different sizes of the non-standard size scanned items can vary much more dramatically from non-standard size print media, the solutions to the technical problems of systems that accommodate non-standard size scanned items must be more adaptable to many more different sizes, as well as a greater ranges of sizes.

Further, systems for scanning non-standard size items must be much easier to use (relative to systems that handle non-standard size print media) because the relatively larger number of non-standard sizes of items being scanned discourages users from spending large amounts of time performing inefficient operations to define a non-standard size, especially if that non-standard size that may only be used a few times in future scanning operations, or may only be used infrequently. In contrast, systems that address the technical problems of non-standard size print media can be less efficient because there are fewer of such non-standard sizes for print media, and such are therefore more likely to be defined less frequently. Therefore, teachings from solutions to the technical problem of non-standard size media are not readily applicable to systems that solve the technical problems of non-standard size scanned items.

As shown above, the methods and systems disclosed herein address many technical problems that would not be encountered by systems that accommodate non-standard size print media. For example, the methods and systems herein do not disturb the natural scanning workflow; while, in contrast, non-standard size print media systems interrupt the process of printing by requiring scans, physical measurements, measurements by sensors, etc. More specifically, the methods and systems herein estimate the size of the item being scanned as part of the scanning process (e.g., during the pre-scan, during user login, etc.). Further, the methods and systems disclosed herein allow the user to easily add additional custom sizes by merely clicking a single button (e.g., save button 114). Also, systems herein allow users to easily retrieve previously saved, or previously used, custom sizes through a minimum number of interactions with the user interface.

In doing so, the methods and systems herein greatly encourage the user to save more and more custom sizes, and to use previously used or saved custom sizes more often. Thus, these methods and systems allow users to properly define the exact size of the non-standard items being scanned, which allows scan data to be taken from a limited area of the overall platen (potentially reducing file size to improve storage efficiency), allows processing resources to be focused on smaller number of pixels from the optical sensor, eliminates problems with scanning undesirable elements (e.g., scanning portions of the platen cover, border edges of the item being scanned, shadow areas, etc.), etc.

FIG. 10 illustrates many components of printer structures 204 herein that can comprise, for example, a printer, copier, multi-function machine, multi-function device (MFD), etc. The printing device 204 includes a controller/tangible processor 224 and a communications port (input/output) 214 operatively connected to the tangible processor 224 and to a computerized network external to the printing device 204. Also, the printing device 204 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the printing device 204 and comprises a wired device or wireless device (of any form, whether currently known or developed in the future). The tangible processor 224 controls the various actions of the printing device 204. A non-transitory, tangible, computer storage medium device 210 (which can be optical, magnetic, capacitor based, etc., and is different from a transitory signal) is readable by the tangible processor 224 and stores instructions that the tangible processor 224 executes to allow the computerized device to perform its various functions, such as those described herein. Thus, as shown in FIG. 10, a body housing has one or more functional components that operate on power supplied from an alternating current (AC) source 220 by the power supply 218. The power supply 218 can comprise a common power conversion unit, power storage element (e.g., a battery, etc), etc.

The printing device 204 includes at least one marking device (printing engine(s)) 240 that use marking material, and are operatively connected to a specialized image processor 224 (that is different than a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies marking material (toner, inks, plastics, organic material, etc.) to continuous media, sheets of media, fixed platforms, etc., in two- or three-dimensional printing processes, whether currently known or developed in the future. The printing engines 240 can include, for example, devices that use electrostatic toner printers, inkjet printheads, contact printheads, three-dimensional printers, etc. The one or more printing engines 240 can include, for example, devices that use a photoreceptor belt or an intermediate transfer belt or devices that print directly to print media (e.g., inkjet printers, ribbon-based contact printers, etc.).

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the methods and systems described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, book-making machine, facsimile machine, multi-function machine, etc., which performs a print outputting function for any purpose. The details of printers, printing engines, etc., are well-known and are not described in detail herein to keep this disclosure focused on the salient features presented. The methods and systems herein can encompass methods and systems that print in color, monochrome, or handle color or monochrome image data. All foregoing methods and systems are specifically applicable to electrostatographic and/or xerographic machines and/or processes.

Thus, an image input device is any device capable of obtaining pixel values from an image. The set of image input devices is intended to encompass a wide variety of devices such as, for example, digital document devices, computer systems, memory and storage devices, networked platforms such as servers and client devices which can obtain pixel values from a source device, and image capture devices. The set of image capture devices includes scanners, cameras, photography equipment, facsimile machines, photo reproduction equipment, digital printing presses, xerographic devices, and the like. A scanner is one image capture device that optically scans images, print media, and the like, and converts the scanned image into a digitized format. Common scanning devices include variations of the flatbed scanner, generally known in the arts, wherein specialized image receptors move beneath a platen and scan the media placed on the platen. Modern digital scanners typically incorporate a charge-coupled device (CCD) or a contact image sensor (CIS) as the image sensing receptor(s). The scanning device produces a signal of the scanned image data. Such a digital signal contains information about pixels such as color value, intensity, and their location within the scanned image.

Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the methods and systems herein cannot be implied or imported from any above example as limitations to any particular order, number, position, size, shape, angle, color, or material.

The invention claimed is:

1. An apparatus comprising:
a scanner;
a processor electrically connected to said scanner;
an electronic memory electrically connected to said processor; and
a user interface electrically connected to said processor,
said user interface comprising a display screen,
said display screen displaying dimension input fields that identify dimensions of an item to be scanned using said scanner,
said display screen displaying an option to reuse the most recently used input dimensions for said item to be scanned,
said display screen displaying an option to select from a list of recently used input dimensions for said item to be scanned,
said option to reuse the most recently used input dimensions being in addition to, and separate from, said option to select from a list of recently used input dimensions on said display screen, and
said processor saving values of said dimension input fields in said electronic memory.

2. The apparatus according to claim 1, said display screen displaying an option of whether to save said dimensions of said dimension input fields.

3. The apparatus according to claim 1, said most recently used input dimensions comprising dimensions of said item to be scanned that were last used when scanning with said scanner.

4. The apparatus according to claim 1, said scanner performing a pre-scan operation of said item to be scanned that produces a pre-scan image, said processor automatically determining an estimate of dimensions of said item to be scanned based on said pre-scan image, and said processor automatically supplying estimated dimensions to said dimension input fields based on said estimate of dimensions.

5. The apparatus according to claim 1, said display screen displaying a user identification input field, and said processor automatically supplying user-preferred dimensions to said dimension input fields in response to a user identifier being supplied to said user identification input field.

6. The apparatus according to claim 5, said display screen displaying a user-specific menu option to manually define said user-preferred dimensions, or said processor automatically learning said user-preferred dimensions based on previous scanning operations performed with said user identifier.

7. The apparatus according to claim 1, said processor determining whether to display said dimension input fields on said display screen based on whether said scanner detects an attempt to scan an industry standard size item or a custom size item that does not have an industry standard size.

8. A method comprising:
- displaying, on a display screen of a user interface, dimension input fields that identify dimensions of an item to be scanned, as directed by a processor, using a scanner that is electrically connected to said user interface through said processor;
- displaying, on said display screen, an option to reuse the most recently used input dimensions for said item to be scanned;
- displaying, on said display screen, an option to select from a list of recently used input dimensions for said item to be scanned, said option to reuse the most recently used input dimensions being in addition to, and separate from, said option to select from a list of recently used input dimensions on said display screen; and
- saving values of said dimension input fields in electronic memory that is electrically connected to said processor.

9. The method according to claim 8, further comprising displaying, on said display screen, an option of whether to save said dimensions of said dimension input fields.

10. The method according to claim 8, said most recently used input dimensions comprising dimensions of said item to be scanned that were last used when scanning with said scanner.

11. The method according to claim 8, further comprising:
- performing a pre-scan operation of said item to be scanned using said scanner to produce a pre-scan image;
- automatically determining an estimate of dimensions of said item to be scanned based on said pre-scan image, using said processor; and
- automatically supplying estimated dimensions to said dimension input fields based on said estimate of dimensions, using said processor.

12. The method according to claim 8, further comprising:
- displaying a user identification input field on said display screen; and
- automatically supplying user-preferred dimensions to said dimension input fields in response to a user identifier being supplied to said user identification input field, using said processor.

13. The method according to claim 12, further comprising:
- displaying a user-specific menu option to manually define said user-preferred dimensions on said display screen; or
- automatically learning said user-preferred dimensions based on previous scanning operations performed with said user identifier, using said processor.

14. The method according to claim 8, further comprising determining, using said processor, whether to display said dimension input fields on said display screen based on whether said scanner detects an attempt to scan an industry standard size item or a custom size item that does not have an industry standard size.

15. A processor electrically connected to a scanner, an electronic memory, and a user interface comprising a display screen, said processor:
- causing said display screen to display dimension input fields that identify dimensions of an item to be scanned using a scanner that is electrically connected to said user interface through a processor;
- causing said display screen to display an option to reuse the most recently used input dimensions for said item to be scanned;
- causing said display screen to display an option to select from a list of recently used input dimensions for said item to be scanned, said option to reuse the most recently used input dimensions being in addition to, and separate from, said option to select from a list of recently used input dimensions on said display screen; and
- saving values of said dimension input fields in said electronic memory.

16. The processor according to claim 15, said processor causing said display screen to display an option of whether to save said dimensions of said dimension input fields.

17. The processor according to claim 15, said most recently used input dimensions comprising dimensions of said item to be scanned that were last used when scanning with said scanner.

18. The processor according to claim 15, said processor causing said scanner to perform a pre-scan operation of said item to be scanned that produces a pre-scan image, said processor automatically determining an estimate of dimensions of said item to be scanned based on said pre-scan image, and said processor automatically supplying estimated dimensions to said dimension input fields based on said estimate of dimensions.

19. The processor according to claim 15, said processor causing said display screen to display a user identification input field, and said processor automatically supplying user-preferred dimensions to said dimension input fields in response to a user identifier being supplied to said user identification input field.

20. The processor according to claim 19, said processor causing said display screen to display a user-specific menu option to manually define said user-preferred dimensions, or said processor automatically learning said user-preferred dimensions based on previous scanning operations performed with said user identifier.

* * * * *